United States Patent [19]

Anderegg et al.

[11] 4,063,572
[45] Dec. 20, 1977

[54] SWITCHING CONNECTOR FOR PIPES, PARTICULARLY FOR PNEUMATIC CONVEYING

[75] Inventors: Hans Rudolf Anderegg, Niederuzwil; Karl Müller, Uzwil, both of Switzerland

[73] Assignee: Gebrueder Buehler AG, Uzwil, Switzerland

[21] Appl. No.: 734,640

[22] Filed: Oct. 21, 1976

[30] Foreign Application Priority Data

Oct. 22, 1975 Switzerland .................. 13661/75

[51] Int. Cl.² ................................ F17D 1/08
[52] U.S. Cl. ................. 137/862; 137/614.11; 137/625.46; 251/161
[58] Field of Search ............... 137/315, 559, 609, 612, 137/614.11, 625.46; 251/159, 161, 360

[56] References Cited

U.S. PATENT DOCUMENTS

| | | | |
|---|---|---|---|
| 3,319,655 | 5/1967 | Palmer | 137/614.11 X |
| 3,828,932 | 8/1974 | Schneer | 137/625.46 X |

*Primary Examiner*—Edgar W. Geoghegan
*Attorney, Agent, or Firm*—Michael J. Striker

[57] ABSTRACT

A switching connector for pipes and the like includes a support component and a carrier component mounted on the support component for turning about an axis. The carrier component has a passage which extends between two axial ends of the carrier component, and the support component has ports which communicate with a main pipe and with branch pipes, respectively. The passage has connecting ports at respective longitudinally spaced ends thereof which can be brought into and out of registry at least with the branch ports of the support components. A sealing arrangement is provided about the registering ports of the components, including at least one sealing ring about a port of one of the components and a disc-shaped contact member about at least one port of the other component and having a contact surface with which the sealing ring is in sealing contact when the ports communicate with one another. The disc-shaped contact member has an access opening which aligns with a non-registering port having the sealing ring around the same to afford access to the sealing ring for maintenance and replacement purposes. A closure may be provided for the access opening when the latter is in the support component, or the support component may include a closed housing having an access hole provided with a closure, through which access hole the access opening in the carrier component becomes accessible from the exterior of the housing. An auxiliary sealing arrangement may surround the sealing ring, being in contact with the contact surface of the contact member during switching of the connector from communication of the connecting port with one of the branch ports into registry with another branch port. Pressurized medium, such as pressurized air, can urge the sealing arrangement into sealing contact with the contact surface.

22 Claims, 10 Drawing Figures

Fig 1

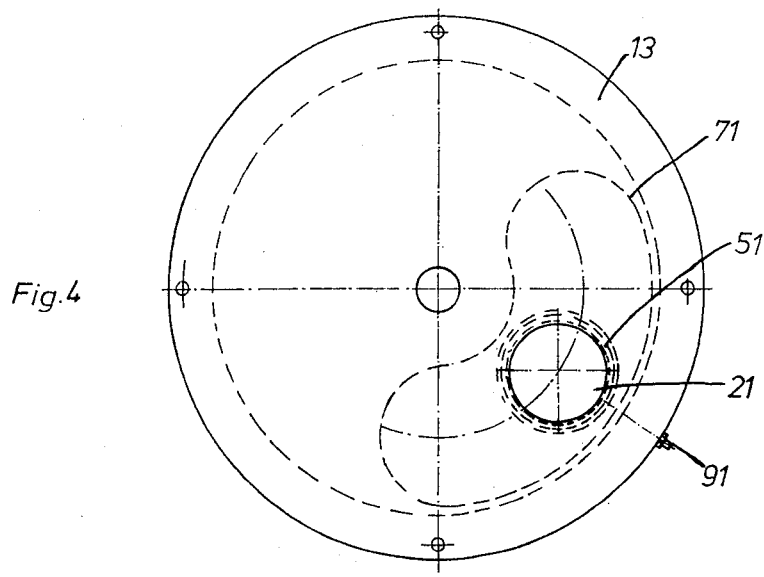
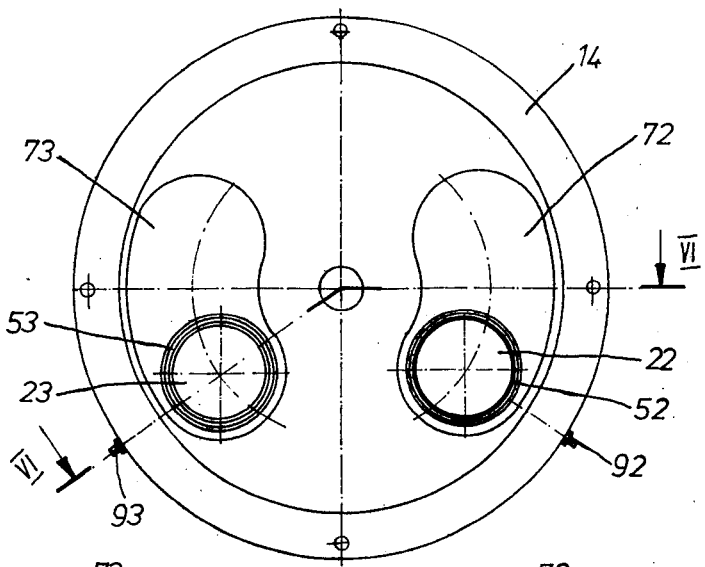
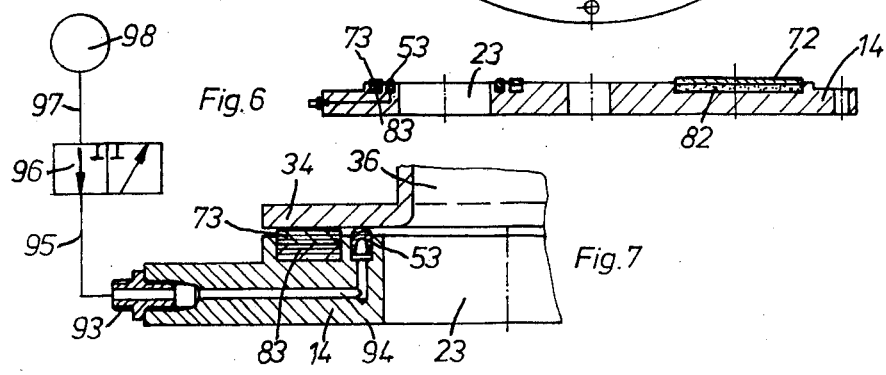

SWITCHING CONNECTOR FOR PIPES, PARTICULARLY FOR PNEUMATIC CONVEYING

BACKGROUND OF THE INVENTION

The present invention relates to switching connectors in general, and more particularly to switching connectors which are to be interposed between a main pipe and at least two branch pipes to selectively control the flow of fluid through the pipes.

There are already known various arrangements of the type here under consideration. Among such arrangements, there is one which utilizes a stationary support component and a carrier component mounted on the support component for turning relative thereto between a plurality of switching positions in each of which a passage provided in the carrier components establishes communication between a main pipe and one of a plurality of branch pipes between which the prior-art connector of this type is interposed. It is already known, in this prior-art connector, to provide annular seals about the region of communication of the passage in the carrier component with the main pipe and the branch pipes, respectively. Such sealing ring, or a plurality of such sealing rings, is arranged about a respective port of one of the components, while the other component has a disc-shaped contact member having a port or a plurality of ports which open on a contact surface of the contact member, the sealing ring or rings being in sealing contact with the contact surface of the contact member. The contact surface has such a configuration as to be permanently sealingly contacted by the sealing ring or sealing rings, whether the ports of the two components are in registry or intermediate the registering positions, to thereby avoid unnecessary interruption of flow of the fluid through the pipes during the switching of the connector between its registering positions.

This conventional connector is advantageous in many respects. First of all, the passage, or a plurality of passages in the carrier component, extends generally in the same direction as the aforementioned pipes in this conventional connector, so that the flow of the fluid between the main pipe and the branch pipes suffers only a minimum amount of diversion from such direction as it passes through the connector. On the other hand, all ports, whether they are used or not in any particular switching position of the carrier component, are sealed during the operation of the connector.

However, this conventional connector has at least one serious drawback which resides in the fact that the sealing rings or similar sealing arrangements are inaccessible without disassembling the connector. It will be appreciated that such a disassembly of the connector and the subsequent re-assembly thereof is very time-consuming and inconvenient, particularly inasmuch as it requires a lengthy interruption of the flow of the fluid through the pipes.

SUMMARY OF THE INVENTION

Accordingly, it is a general object of the present invention to avoid the disadvantages of the prior art.

More particularly, it is an object of the present invention to provide a connector of the type here under consideration which is not possessed of the above-discussed disadvantage.

It is still another object of the present invention to provide a connector for connecting pipes and the like in which the aforementioned sealing arrangement is easily accessible for maintenance and replacement purposes.

A concomitant object of the present invention is to so construct the connector as to be able to gain access to the sealing arrangement without substantial, if any, interruption in the flow of the fluid passing through the pipes.

Still another object of the present invention is to provide a switching connector which has excellent sealing properties.

In pursuance of these objects and others which will become apparent hereafter, one feature of the present invention resides, briefly stated, in a switching connector for pipes and the like, which comprises support means having first communicating means including a plurality of branch ports each adapted to communicate with a branch pipe; carrier means having at least one elongated passage adapted to communicate with a main pipe at one end thereof and having second communicating means including a connecting port at the other end thereof, and mounted on the support means for relative turning about an axis between a plurality of positions in which the connecting port registers and is out of registry with one of the branch ports, respectively; a contact member connected to one of the carrier and support means and having a contact surface surrounding the respective communicating means of the above-mentioned one means; and sealing means mounted on the other of the carrier and sealing means about the respective communicating means of the aforementioned other means and in sealing contact with the contact surface about the registering ports. In this connector, the above-mentioned one means has an access opening which aligns with a non-registering port of the other means in one of the positions of the carrier means to afford access to the sealing means mounted about such non-registering port for maintenance and replacement of such sealing means.

When the connector is constructed in the above-mentioned manner, the sealing means can be replaced within a very short period of time. The sealing means may include at least one sealing ring, and the access opening may have transverse dimensions exceeding those of the sealing ring, thereby making the sealing ring easily accessible. Because of such an easy accessibility of the sealing ring, the latter can be mounted on the other means in a very reliable manner.

In one currently preferred embodiment of the present invention, the one end of the passage is radially offset from the axis about which the carrier means turns and has additional second communicating means including an additional connecting port at the above-mentioned one end thereof. Furthermore, the carrier means has at least one additional passage similar to and spaced from the aforementioned passage, and the support means has additional first communicating means including a main port adapted to communicate with the main pipe. In this embodiment, the additional connecting ports respectively register with the main port when the connecting ports respectively register each with a different branch port. When the carrier means is constructed in this manner, the connector further comprises an additional contact member similar to the aforementioned contact member, additional sealing means similar to the sealing means, and additional access opening similar to the access opening, all arranged at the additional first and second communicating means. When the switching connector is constructed according to this aspect of the present invention, the connector can be so designed as to have relatively small dimensions and also the extent to which the carrier means is to be turned between the switching positions thereof can be reduced as compared to other constructions. In addition thereto, the drive which turns the carrier means can be very simple in construction and operation.

In this embodiment of the present invention, it is further advantageous when the passages are distributed about and extend substantially along the axis of turning of the carrier means relative to the support means, so that the flow of the fluid between the main pipe and the branch pipes will be diverted only to a minimum extent during its advancement through the respective passages.

According to a further facet of the present invention, the contact member is disc-shaped, and the access opening is a cutout in the disc-shaped contact member. This results in a very advantageous, space-saving and simple construction of the carrier means.

The disc-shaped contact member may be connected to the carrier means for joint turning therewith, and the support means may include a closed housing having an access hole which communicates the exterior of the housing with the interior thereof and which affords access to the cutout of the disc-shaped contact member. The connector of the present invention may further comprise a closure for the access hole, whereby the interior of the housing can be separated from the exterior thereof at least during the use of the connector. The closure may hermetically seal the interior of the housing with respect to the exterior thereof.

In a different embodiment of the present invention, the disc-shaped contact member is connected to the support means and thus remains stationary during the turning of the carrier means relative to the support means. Under these circumstances, the above-mentioned cutout directly communicates with the exterior of the support means which may again be constructed as a closed housing, and a closure may be provided for hermetically closing the cutout.

The latter embodiment is particularly advantageous in that the sealing means is directly accessible from the exterior of the support means, without any need to first obtain access into the interior of the housing.

Preferably, the aforementioned positions include a plurality of switching positions in each of which the connecting port communicates with one of the branch ports, and at least one access position in which the sealing means is accessible to the access opening. Then, the contact surface of the contact member may have such dimensions as to be sealingly contacted by the sealing means while the carrier means is in and also in between the switching positions thereof.

When the connector is constructed in the just-discussed manner, auxiliary sealing means may be mounted on the other means so as to surround the sealing means, the contact surface of the contact member having such dimensions as to be in sealing contact also with the auxiliary sealing means while the carrier means is in and in between the switching positions thereof. In this manner, it is possible to use the connector for conducting fluid between the main pipe and the branch pipes even while the connector is being switched from communicating with one to communicating with another branch pipe, without having to fear that the fluid so conducted through the connector may leak out at the interface between the carrier means and the support means.

In this respect, it is also very advantageous as proposed by the present invention to displaceably mount the sealing means on the other means, and to provide means which urges the sealing means for displacement into sealing contact with the contact surface. The urging means may be a pressurized fluid which is accommodated between the other means and the sealing means, and means for controlling the pressure of the pressurized fluid can also be provided. Preferably, the fluid is a gaseous medium. On the other hand, it is also advantageous when the auxiliary sealing means is mounted on the other means in a resilient manner. A layer of resilient material may be sandwiched between the auxiliary sealing means and the other means which then resiliently mounts the auxiliary sealing means on the other means. This mounting of the auxiliary sealing means is especially simple and advantageous.

The contact member has a marginal portion which bounds the access opening, and such marginal portion may be rounded or chamfered at the contact surface of the contact member in order to facilitate the bringing of the sealing means into sealing contact with the contact surface of the contact member.

While the construction of the connector is very advantageous when the carrier means has at least two passages each communicating the main pipe with a different branch pipe, it is also contemplated by the present invention to embody the above-discussed concept in a connector which has only a single passage the one end of which concentrically surrounds the axis of rotation of the carrier means, in coaxial alignment with the main pipe with which the connector is assembled. In this case, a conventional sealing arrangement is provided at the junction of the main pipe with the one end of the single passage in the carrier means, and the concept of the present invention is only utilized at the other end of the passage, that is, intermediate the connecting port of the passage and the branch ports of the support means.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWINGS

FIG. 4 is a simplified plan view similar to FIG. 2 but of a modified embodiment of the present invention;

FIG. 5 is a bottom plan view of a further modification of the connector according to the present invention;

FIG. 6 is a section taken on line VI—VI of FIG. 5;

FIG. 7 is a sectional view of a detail of FIG. 6 at a larger scale and also illustrates an arrangement for supplying pressurized fluid;

DETAILED DISCUSSION OF THE PREFERRED EMBODIMENTS

Figure 1:
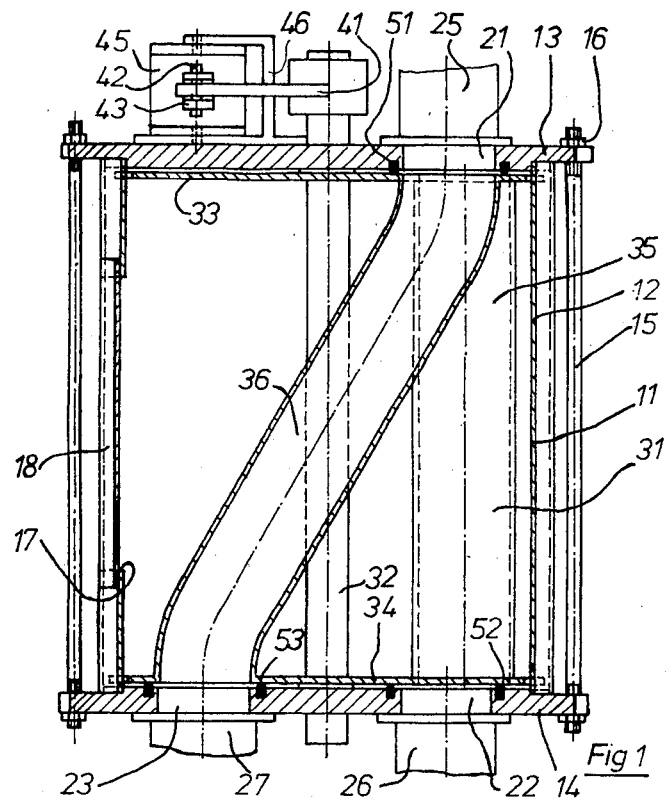
FIG. 1 is a sectional view of a connector of the present invention taken on line I—I of FIG. 2.
Figure 2:
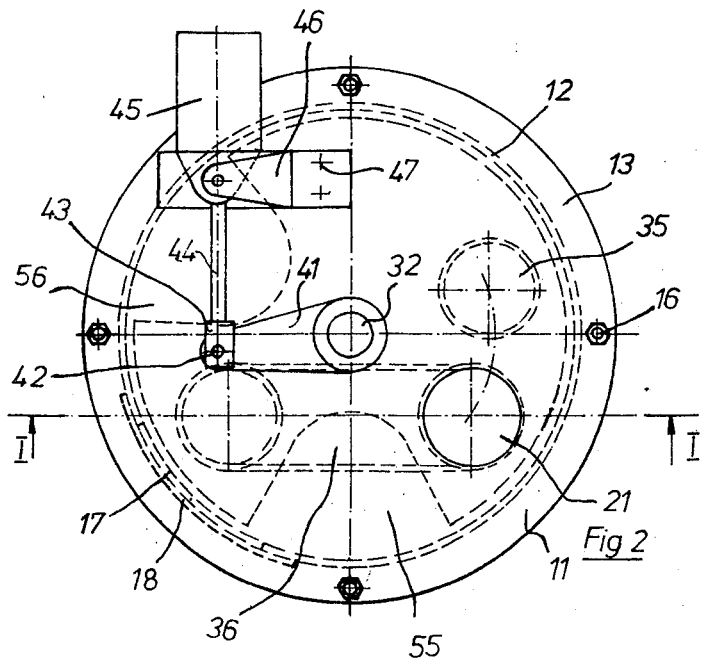
FIG. 2 is a top plan view of the connector of FIG. 1.

Referring now to the drawings in detail, and first to FIGS. 1 and 2 thereof, it may be seen that the connector of the present invention includes a support component 11 including a cylindrical jacket 12, an upper support disc 13 and a lower support disc 14. In this connection, it is to be mentioned that all directional references used in the description refer to the connector as illustrated, and not necessarily as the same is used.

The upper and lower support discs 13 and 14 are connected with another by means of threaded members 15 which are being axially pressed against the cylindrical jacket 12 by means of nuts 16. The cylindrical jacket 12 includes an access hole 17 which is closed by means of a closure or door 18. The support disc 13 is provided with one main port 21 and the lower support disc 14 has two branch ports 22 and 23. These ports 21, 22 and 23 serve to connect the connector to pipes 25, 26 and 27 when the connector of the present invention is assembled with such pipes.

The connector further includes a carrier component 31 which includes a shaft 32 which is mounted in the support discs 13, 14 for turning relative thereto. An upper carrier disc 33 and a lower carrier disc 34 are connected to the shaft 32 for joint turning therewith. A straight connecting conduit 35 bounding a connecting passage, and a curved connecting conduit 36 having a different connecting passage extend between the discs 33 and 34, the passages serving to selectively connect the main port 21 with the branch port 22 and the branch port 23, respectively.

A crank 41, forming a part of an arrangement for turning the carrier component 31, is fastened to the shaft 32, and bolts 42 connect the crank 41 to a bifurcated portion 43 of a piston rod 44. The piston rod 44 is reciprocated by means of an actuating cylinder-and-piston unit 45 which is mounted on the upper support disc 13 by means of a bracket 46 and screws 47.

An annular sealing element 51 is arranged at the inner surface of the upper support disc 13 at the main port 21, which sealing element 51 is in sealing contact with a contact surface of the upper carrier disc 33 of the carrier component 31. In a similar manner, annular sealing elements 52, 53 are mounted at the inner side of the lower support disc 14 at the branch ports 22, 23. These sealing elements 52, 53 are in sealing contact with a contact surface of the lower carrier disc 34 of the carrier component 31.

Figure 3:
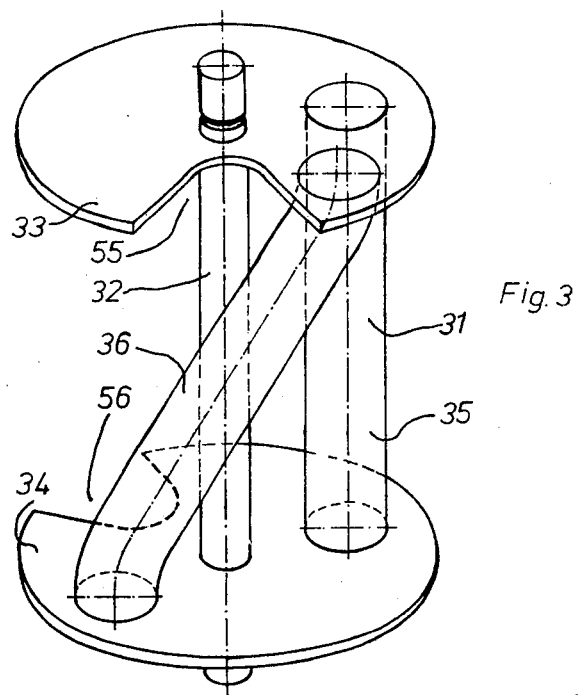
FIG. 3 is a perspective view of a carrier component employed in the connector of FIGS. 1 and 2.

As particularly seen in FIG. 3, the carrier disc 33 is formed with a cutout 55 and the carrier disc 34 has a cutout 56. These cutouts 55, 56 constitute interruptions in the contact surfaces which are provided at the carrier discs 33, 34. The dimensions of the cutouts 55, 56 are preferably somewhat greater than the corresponding dimensions of the annular sealing elements 51, 52 or 53.

Having so discussed the structure of the connector, the operation thereof will now be briefly discussed. When the carrier component 31 is in the position thereof which is illustrated in FIGS. 1 and 2, connection is established between the main pipe 25 and the branch pipe 27 via the main port 21, the connecting conduit 36 and the branch port 23. Because of the above-discussed construction of the connector, the branch pipe 26, even though not used for forwarding fluid thereinto or therefrom, is sealed by the cooperation of the sealing element 52 with the contact surface of the carrier disc 34.

When the connector is to be switched, the actuating cylinder-and-piston unit 45 retracts the piston rod 44 so that the crank 41 and, consequently, the shaft 32 and thus the entire carrier component 31 are rotated in the clockwise direction until the main pipe 25 communicates with the branch pipe 26 via the main port 21, the connecting conduit 35 and the branch port 22. Owing to the relatively large dimensions of the carrier discs 33, 34, and particularly of the contact surfaces thereof, the sealing elements 51, 52 and 53 will remain in sealing contact with such sealing surfaces during the entire switching process. Due to the relatively small extent of turning movement of the carrier component 31 which is needed for accomplishing the switching procedure, such procedure can be accomplished in a relatively short period of time and, therefore, it is not necessary to interrupt the operation of the main pipe 25.

When it is desired or necessary to check on, repair or otherwise maintain, or replace the annular sealing element 51, it is merely necessary to open the door 18 and to remove the bolt 42 which connects the piston rod 44 and the crank 41. Subsequently thereto, the carrier component 31 is turned by applying a force to the crank 41 until the cutout 55 aligns with the main port 21. Subsequently thereto, the sealing element 51 can be easily dismounted and either replaced by a different one or returned upon checking or repair. A similar procedure is also followed when it is desired to dismount the sealing elements 52, 53. Under these circumstances, the cutout 56 must be aligned with the branch port 22 or the branch port 23, respectively.

As already mentioned before, it is not necessary that the connector be used in the illustrated position. So, for instance, depending on the particular requirements and particularly on the directions of the pipes 25, 26 and 27, the connector could be used in an upside down position, and the axis of rotation of the carrier component could extend horizontally or, for that matter, the connector of the present invention could assume any spatial position. Also, while the present connector has been described and illustrated as having one main port, two branch ports and two connecting conduits, it is to be understood that the number of such ports and connecting conduits could be greater than that.

In addition thereto, while the support component 11 has been described and illustrated as being of a closed construction, this need not be so under all circumstances. So, for some applications, the support component could be constructed as an open structure which carries the bearings for the carrier component 31 and the respective ports 21, 22 and 23. Furthermore, instead of using the cylinder-and-piston unit 45 which may be reciprocated by a hydraulic or pneumatic fluid, it is also possible to reciprocate such unit 45 by electromagnetic means or the like.

Excellent results are achieved by using the connector illustrated in FIGS. 1 through 3 when such connector is used for conveying fluid which is at a subatmospheric pressure. Under these circumstances, it is of no practical significance that the annular sealing elements 51, 52 and 53 travel over the connecting ports of the connecting conduits 35 and 36 during the switching of the connector. It would only mean that air from the interior of the support component 11 would be drawn into one of the pipes 25, 26 and 27, which false air could be entirely acceptable and would be only a small price to pay for the simplicity of construction of the connector. In any event, the amount of the false air penetrating into the pipes 25, 26 or 27 would be very insignificant, particularly when the housing 12, 13, 14 of the support component 11 is hermetically sealed by the closure or door 18. However, if the fluid in the pipes 25, 26 and 27 were at superatmospheric pressure, the above-discussed travel of the sealing elements 51, 52 and 53 over the connecting ports of the connecting conduits 35, 36 would create the possibility that some of the fluid being conveyed between the main pipe 25 and the branch pipes 26 or 27 could escape into the interior of the support component 11. However, even this disadvantage could be avoided by maintaining the pressure within the support component 11 at a level exceeding the pressure of the fluid being conducted in the respective connecting conduits 36, 35 between the pipes 25, 26 and 27.

This possibility of escape is not present at all when the connector of the present invention is constructed as illustrated in FIGS. 4 through 7.

In this embodiment, as particularly seen in FIG. 4, the sealing element 51 is surrounded by an auxiliary seal 71 which is so configurated that it is in sealing contact with the contact surface of the carrier disc 33 while the carrier component 31 is being switched between the various switching positions thereof, thereby completely sealing the connecting conduits 35 and 36. Furthermore, the annular sealing elements 52 or 53 are similarly surrounded by further seals 72 or 73 which are again so configurated that they are in sealing contact with the sealing surface of the carrier disc 34 during the turning of the carrier component 31 between the switching positions thereof to thereby also seal the connecting conduits 35 or 36 at the other axial end of the connector.

Referring now in particular to FIGS. 6 and 7, it may be seen that the seal 72 is mounted on a resilient base 82, and the seal 73 is mounted on a resilient base 83.

A nipple 93 is mounted on the support disc 14 and communicates with a passage 94 which, in turn, communicates with a space underneath the sealing element 53, with a conduit 95 which, in turn, communicates, via a two-position three-port valve 96 and a further conduit 97, with a source 98 of pressurized air. The annular sealing element 53 has a U-shaped configuration, thereby improving the sealing contact therewith with the surfaces which bound the recess in which the sealing element 53 is accommodated so as to prevent escape of the pressurized air around the sealing element 53. The elements 93 to 98 constitute a selectively actuatable urging arrangement for pressing the sealing element 53 into sealing contact with the contact surface of the carrier disc 34. The annular sealing elements 51 and 52 can be urged against respective contact surfaces in an analogous manner. Nipples 91 (FIG. 4) and 92 (FIG. 5) serve the same purpose as the nipple 93. Conduits may be provided which communicate the nipples 91 and 92 either with the conduit 95, or with the conduit 97, in which latter event further valves similar to the valve 96 will have to be arranged in such conduits to be able to control the pressure of the pressurized air which acts on the annular sealing elements 51, 52, respectively.

The seal 71 is mounted on a resilient base, similarly to the seals 72 and 73; because of such similarity, the mounting of the seal 71 has not been illustrated.

During the normal operation of the connector, pressurized air is admitted to the sealing elements 51, 52 and 53 to urge the same into sealing contact with the respective contact surfaces of the carrier discs 33 and 34, respectively. Thus, the sealing elements 51, 52 and 53 perform their sealing functions. The valve 96 is in its illustrated position under these circumstances.

When it is desired to switch the carrier component 31 between its switching positions, the valve 96 is moved into its non-illustrated other position so that the pressure of air acting on the respective sealing elements 51, 52 and 53 is relieved. The seals 71, 72 and 73 perform the sealing function alone during the switching of the carrier component 31. While it is true that the sealing effect of these seals 71, 72 and 73 is somewhat less pronounced than the sealing effect of the sealing elements 51, 52 and 53, such sealing effect is more than sufficient for the short period of time consumed by turning the carrier component 31 between its respective switching positions.

It is, of course, also possible to provide the cutouts 55, 56 at other locations of the carrier rings 33, 34, as desired, and especially to make them of such dimensions as to also afford access to the auxiliary seals 71, 72 and 73 in the same manner as to the annular sealing elements 51, 52 and 53, for maintenance and/or replacement purposes.

Figure 9:
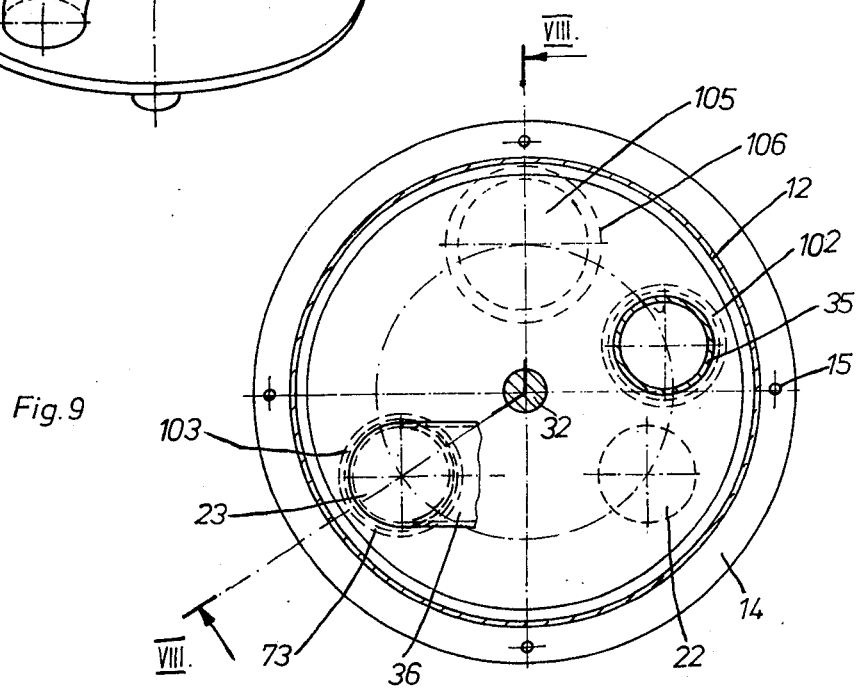
FIG. 9 is a top plan view of the bottom part of the modified connector illustrated in FIG. 8.
Figure 8:
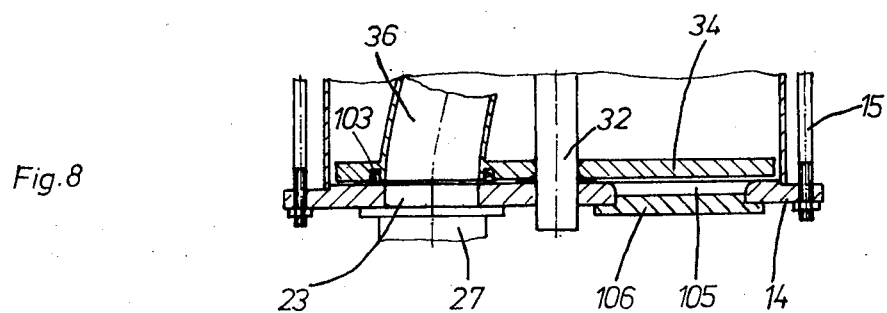
FIG. 8 is a sectional view taken on line VIII—VIII of FIG. 9 of a bottom end of a modified connector of the present invention.

FIGS. 8 and 9 illustrate a further modified embodiment of the present invention in which the annular sealing elements are not mounted on the support discs 13, 14, but rather on the carrier discs 33 and 34. These sealing elements include an annular sealing element 103 which surrounds the lower connecting port of the connecting conduit 35 (compare FIG. 9) and an annular sealing element 103 (FIGS. 8 and 9) arranged at the lower connecting port of the connecting conduit 36. In this embodiment, the contact surface is provided at the inner side of the support disc 14. Furthermore, the lower support disc 14 is formed with a cutout 105 which affords access into the interior of the support component 11. A closure 106 is provided which is adapted to close the cutout 105. When the annular sealing elements 102 or 103 are to be checked upon or replaced, they are brought into alignment with the cutout 105, to thereby gain access to the sealing elements 102 or 103 through the cutout 105.

Since in the illustrated position, the branch port 22 is out of communication during the operation of the connector, the annular sealing elements 102, 103 must be surrounded by a further seal which is mounted on the carrier disc 34. The configuration and dimensions of such a seal or of such seals correspond to those of the seals 72, 73 illustrated in and described in connection with FIGS. 4 to 7, so that such seals have not been illustrated.

In order to facilitate the introduction of the annular sealing elements 102, 103 into sealing contact with the contact surface, the marginal portions of the support disc 14 which surround the cutout 105 are chamfered or rounded at the contact surface.

An arrangement identical to that which has just been described can also be provided at the upper axial end of the connector between the main port 21 and the passages of the connecting conduits 35 and 36.

Figure 10:
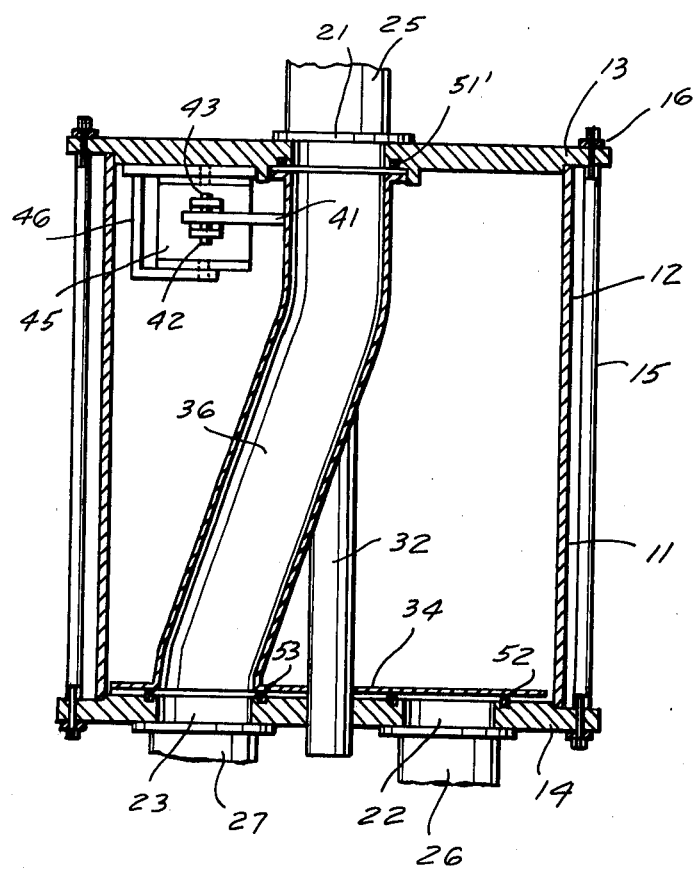
FIG. 10 is a sectional view similar to FIG. 1 but showing a further embodiment of the present invention.

FIG. 10 illustrates a further embodiment of the connector of the present invention in which the carrier component 31 has only one passage formed in a connecting conduit 35'. In this construction, the main port 21 and the main pipe 25 concentrically surround the axis of rotation of the carrier component 31, and a conventional seal is provided at the juncture of the main port 21 with the passage of the connecting conduit 35'. Nevertheless, the sealing arrangement and the means for affording access thereto of the present invention is still embodied at the lower axial end of the connector.

It will be understood that each of the elements described above, or two or more together, may also find a useful application in other types of constructions differing from the types described above.

While the invention has been illustrated and described as embodied in a switching connector for pipes and the like, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A switching connector for pipes and the like, comprising support means having first communicating means including a plurality of branch ports each adapted to communicate with a branch pipe; carrier means having at least one elongated passage adapted to communicate with a main pipe at one end thereof and having second communicating means including a connecting port at the other end thereof, and mounted on said support means for relative turning about an axis between a plurality of positions in which said connecting port registers and is out of registry with one of said branch ports, respectively; a contact member connected to one of said carrier and support means and having a contact surface surrounding the respective communicating means of said one means; and sealing means mounted on the other of said carrier and sealing means about the respective communicating means of said other means and in sealing contact with said contact surface about the registering ports, said one means having an access opening which aligns with a non-registering port of said other means in one of said positions to afford access to said sealing means mounted about such non-registering port for maintenance and replacement of such sealing means.

2. A connector as defined in claim 1, wherein said sealing means includes at least one sealing ring.

3. A connector as defined in claim 2, wherein said access opening has transverse dimensions exceeding those of said sealing ring.

4. A connector as defined in claim 1, wherein said one end of said passage coaxially surrounds said axis.

5. A connector as defined in claim 1, wherein said one end of said passage is radially offset from said axis and has additional communicating means including an additional connecting port at said one end thereof; wherein said carrier means has at least one additional passage similar to and spaced from said passage; wherein said support means has additional first communicating means including a main port adapted to communicate with the main pipe, said additional connecting ports respectively registering with said main port when said connecting ports respectively register each with a different branch port; and further comprising an additional contact member similar to said contact member, additional sealing means similar to said sealing means, and an additional access opening similar to said access opening, all arranged at said additional first and second communicating means.

6. A connector as defined in claim 5, wherein said passages are distributed about and extend substantially along said axis.

7. A connector as defined in claim 1, wherein said contact member is disc-shaped; and wherein said access opening is a cutout in said disc-shaped contact member.

8. A connector as defined in claim 7, wherein said disc-shaped contact member is connected to said carrier means for joint turning therewith.

9. A connector as defined in claim 8, wherein said support means includes a closed housing having an access hole communicating the exterior of said housing with the interior thereof for affording access to said cutout of said disc-shaped contact member.

10. A connector as defined in claim 9; and further comprising a closure for said access hole.

11. A connector as defined in claim 7, wherein said disc-shaped contact member is connected to said support means.

12. A connector as defined in claim 11; and further comprising a closure for said cutout.

13. A connector as defined in claim 1, wherein said positions include a plurality of switching positions in each of which said connecting port communicates with one of said branch ports, and at least one access position in which said sealing means is accessible through said access opening; and wherein said contact surface of said contact member has such dimensions as to be sealingly contacted by said sealing means while said carrier means is in and also inbetween said switching positions.

14. A connector as defined in claim 13; and further comprising auxiliary sealing means mounted on said other means so as to surround said sealing means, said contact surface of said contact member having such dimensions as to be in sealing contact also with said auxiliary sealing means while said carrier means is in and inbetween said switching positions thereof.

15. A connector as defined in claim 14, and further comprising means for displaceably mounting said sealing means on said other means, and means for urging said sealing means for displacement into sealing contact with said contact surface.

16. A connector as defined in claim 15, wherein said urging means is a pressurized fluid accommodated between said other means and said sealing means.

17. A connector as defined in claim 16, and further comprising means for controlling the pressure of said pressurized fluid.

18. A connector as defined in claim 16, wherein said fluid is a gaseous medium.

19. A connector as defined in claim 14; and further comprising means for resiliently mounting said auxiliary sealing means on said other means.

20. A connector as defined in claim 19, wherein said resiliently mounting means includes a layer of resilient material sandwiched between said auxiliary sealing means and said other means.

21. A connector as defined in claim 1, wherein said contact member has a marginal portion which bounds said access opening; and wherein said marginal portion is rounded at said contact surface.

22. A connector as defined in claim 1, wherein said contact member has a marginal portion which bounds said access opening; and wherein said marginal portion is chamfered at said contact surface.

* * * * *